United States Patent
Wang et al.

(10) Patent No.: US 8,287,813 B2
(45) Date of Patent: Oct. 16, 2012

(54) PROCESS TO PRODUCE FINE CERAMIC POWDER THROUGH A CHEMICAL REACTOR WITH POWDER COLLECTION DEVICE

(75) Inventors: Chun-Hsiu Wang, Taoyuan County (TW); Maw-Chwain Lee, Taoyuan County (TW); Yang-Chuang Chang, Taoyuan County (TW); Wei-Xin Kao, Taoyuan County (TW); Tai-Nan Lin, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 300 days.

(21) Appl. No.: 12/628,216

(22) Filed: Dec. 1, 2009

(65) Prior Publication Data
US 2011/0130267 A1    Jun. 2, 2011

(51) Int. Cl.
*B01J 19/00* (2006.01)
(52) U.S. Cl. ......... 422/129; 422/198; 422/199; 422/239
(58) Field of Classification Search .................. 422/129, 422/198, 199, 239
See application file for complete search history.

(56) References Cited

U.S. PATENT DOCUMENTS

| | | | | | |
|---|---|---|---|---|---|
| 1,065,445 | A | * | 6/1913 | Harris | 110/217 |
| 1,530,252 | A | * | 3/1925 | Feigenbaum | 110/217 |
| 5,061,682 | A | * | 10/1991 | Aksay et al. | 505/425 |
| 5,114,702 | A | * | 5/1992 | Pederson et al. | 423/639 |

OTHER PUBLICATIONS

Potdar et al. Synthesis of nanosized Ce0.75Zr0.25O2 porous powders via an autoignition: glycine nitrate process. Materials Letters 57 (2003) pp. 1066-1071.*

Liu et al. Preparation and properties of Ce0.8Ca0.2O1.8 anode material by glycine-nitrate process. Transactions of Nonferrous Metals Society of China 17 (2007) pp. 874-879.*

* cited by examiner

*Primary Examiner* — Jennifer A Leung

(57) ABSTRACT

The present invention is related to producing fine nano or submicron-scale precision ceramic powder by applying an innovative chemical reactor with powder collection to the glycine-nitrate combustion process (GNC-P). The unique feature lies in the utilization of a simple-operating process to massively produce nano or submicron-scale ceramic oxide powder with multiple metal components. The present invention not only provides very high powder collection efficiency and production yield as well as safety but also satisfies requirements of industrial safety and environmental safety, and lowers production cost.

7 Claims, 6 Drawing Sheets

PROCESS TO PRODUCE FINE CERAMIC POWDER THROUGH A CHEMICAL REACTOR WITH POWDER COLLECTION DEVICE

BACKGROUND OF THE INVENTION

1. Field of the Invention

The present invention is related to an innovative process to produce fine (nano- or submicron-scale) ceramic powder by the glycine-nitrate combustion method through a chemical reactor with the powder collection device.

2. Description of the Prior Art

Nanotechnology is considered as one of the most important industries in $21^{st}$ century. From consumer products to advanced high-tech areas, there are always applications of nanotechnology. However, due to the limitation of strict manufacturing conditions for nanomaterials, mass production with low cost has not been achieved. Thus, mass production of nanomaterials to reduce cost will be a critical factor to the success of commercialization.

For ceramic materials, in general, the industrial process uses solid-state reaction method. The oxide precursors are mixed first, and then subject to sintering and reaction to form the specific crystal structure required for the product. After that, physical processes like crushing, grinding and dispersing are used to treat the product to a submicron scale. Although such a process can be scaled up for mass production, it usually involves a time-consuming process of high-temperature sintering for crystalline phase formation and it tends to generate impurity phase. Besides, the grinding and dispersing processes to control particle size are very tedious, lengthy and costly. On the other hand, in academic research, sol-gel method is commonly used to synthesize powder. Although this method can obtain purer crystal phase structure, it is limited by the reaction processed in the solvent system and expensive precursors. So mass production based on this method is also difficult. Recently, glycine-nitrate combustion method (GNC) to produce submicron- or nano-scale ceramic powders has been accepted with a great attention. Its general reaction equation can be expressed as follows:

$$xM^{n+} + yNO_3^- + zNH_2CH_2COOH \rightarrow aMiO_j + bH_2O + cCO_2 + dN_2 + eO_2$$

in which M represents metals with a charge number of n, and x, y, z, a, b, c, d, e are stoichiometric constants for reactants and products, i, j are the number of atoms in formula. Due to low ignition temperature (about 180° C.), fast reaction and uniform composition, the method is very suitable for producing composite ceramic material with multiple metal components. However, the method also has some drawbacks to hinder its use for mass production. For example, its flare temperature of the instant reaction can be as high as 1400° C. and it is very difficult to collect the powder from reaction due to explosive spillover. Therefore, to commercialize GNC powder manufacturing process, it is necessary to have a sophisticated design of an appropriate reactor to solve the issue of powder loss and improve the yield. The present invention includes an innovative reactor design that can be effectively applied to GNC process to produce fine (nano- and submicron-scale) ceramic powders in a mass-production scale and satisfy the requirements of safety, high yield, and low cost with simple operation.

SUMMARY OF THE INVENTION

The main objective for the present invention is to propose an innovative chemical reactor with powder collection system and its application to glycine-nitrate combustion process to produce fine ceramic powder, so it not only generates fine ceramic powder with specific chemical composition in a mass-production scale, and in particular the reactor system also has the essential functions in handling the instant high-temperature flare and pressure during powder formation reaction and effectively collecting the powder to assure reaction system safety and high yield.

The present invention mainly includes the application of CRPC reactor system to glycine-nitrate combustion process (GNC-P) to produce fine (nano- and submicron-scale) ceramic powder. The main equipments include heating, chemical reactor with powder collection and off-gas treatment systems for powder dust recovery. The chemical reactor with powder collection is a combination of a reactor body, a plural number of porous powder-blocking plates, a plural number of cylindrical tubular powder collection tower components and a porous flare-blocking plate. The porous powder-blocking plate assembly comprises a hollow top support plate, a plural number of metal mesh filters and a hollow bottom support plate. The porous flare-blocking plate assembly comprises a hollow top support plate, a plural number of metal mesh filters, a hollow bottom support plate and a porous flare-blocking plate.

DETAILED DESCRIPTION OF THE INVENTION

Figure 1:
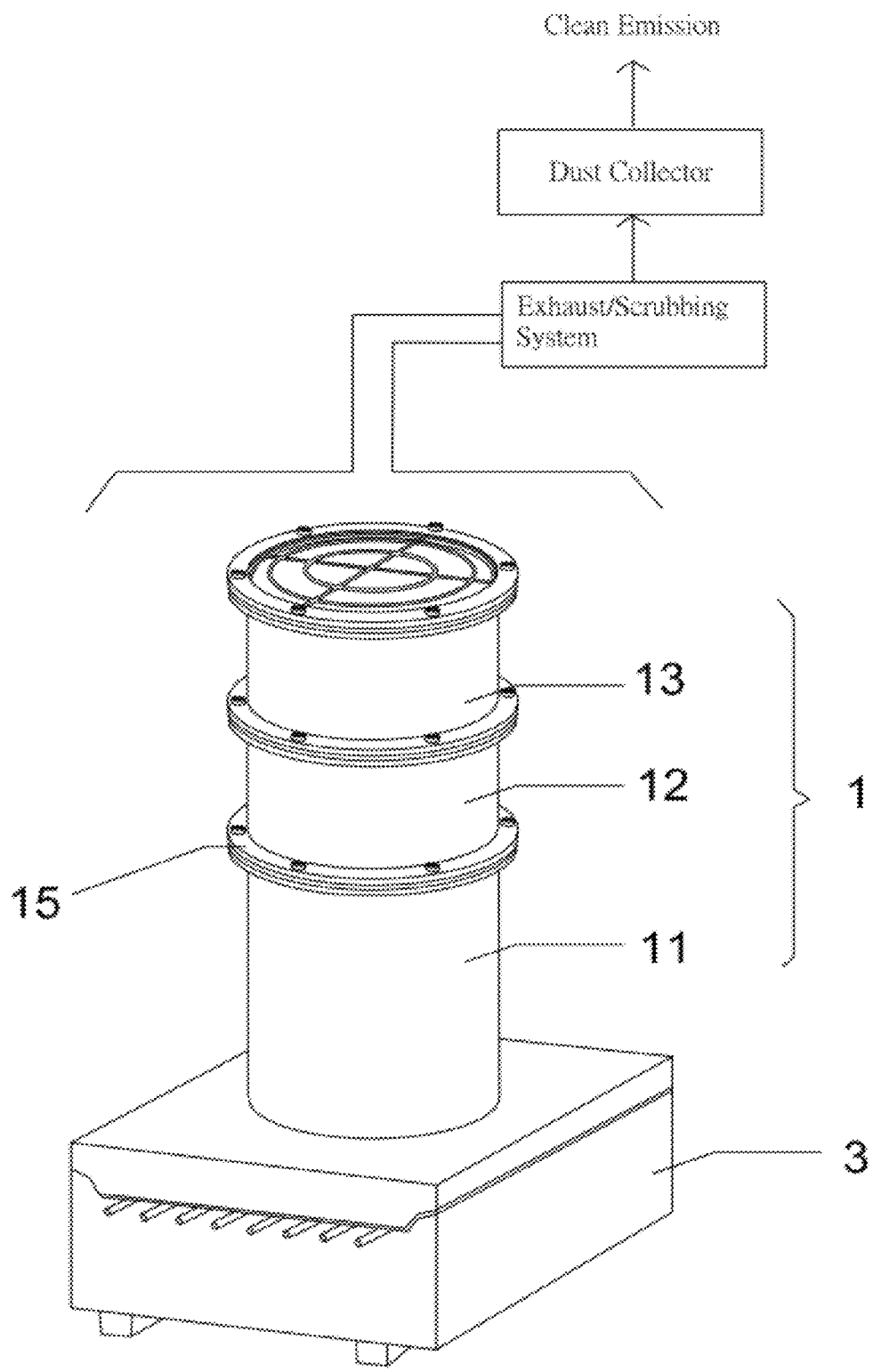
FIG. 1 is an integrated reactor system diagram for the present invention.

The preferred embodiment for the present invention includes designing and fabricating a CRPC reactor system and a process to apply CRPC reactor system to GNC-P to produce the fine (nano- and submicron-scale) ceramic powder with specific chemical composition. The procedures are described as follows.

1. Fabricate and design a CRPC reactor system that at least comprises the following three sub-systems:

1) Design and Fabricate Heating Equipment with Temperature Control and Support to Reactor.

a) The equipment is fabricated with metal (primarily stainless steel) material and includes a temperature-control heating furnace 3 with sensor, so it will shut off once reaction temperature exceeds the set temperature. This is to judge the GNC reaction completion. It also records the relationship between operation temperature and time.

b) The operating temperature range for the heating equipment is between 25° C. and 500° C. It provides heating as well as supporting the chemical reactor with powder collection 1. Thus, the bottom of the chemical reactor with powder collection 1 can effectively contact the heating plate 31 of the temperature-control heating furnace 3 and achieve the objective of heating the reactor 1.

Figure 2:
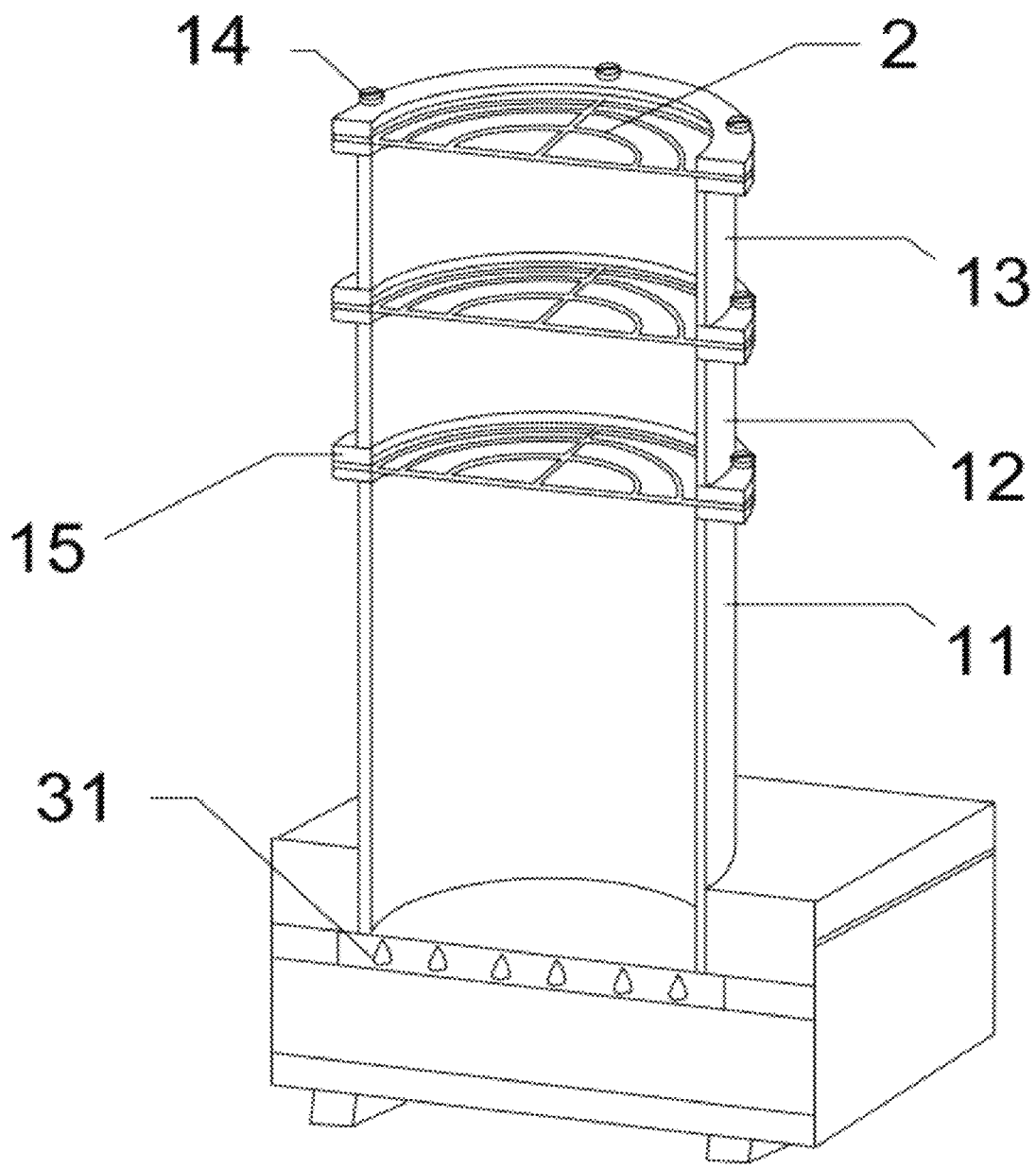
FIG. 2 is a cross-sectional diagram for the reactor for the present invention.
Figure 3:
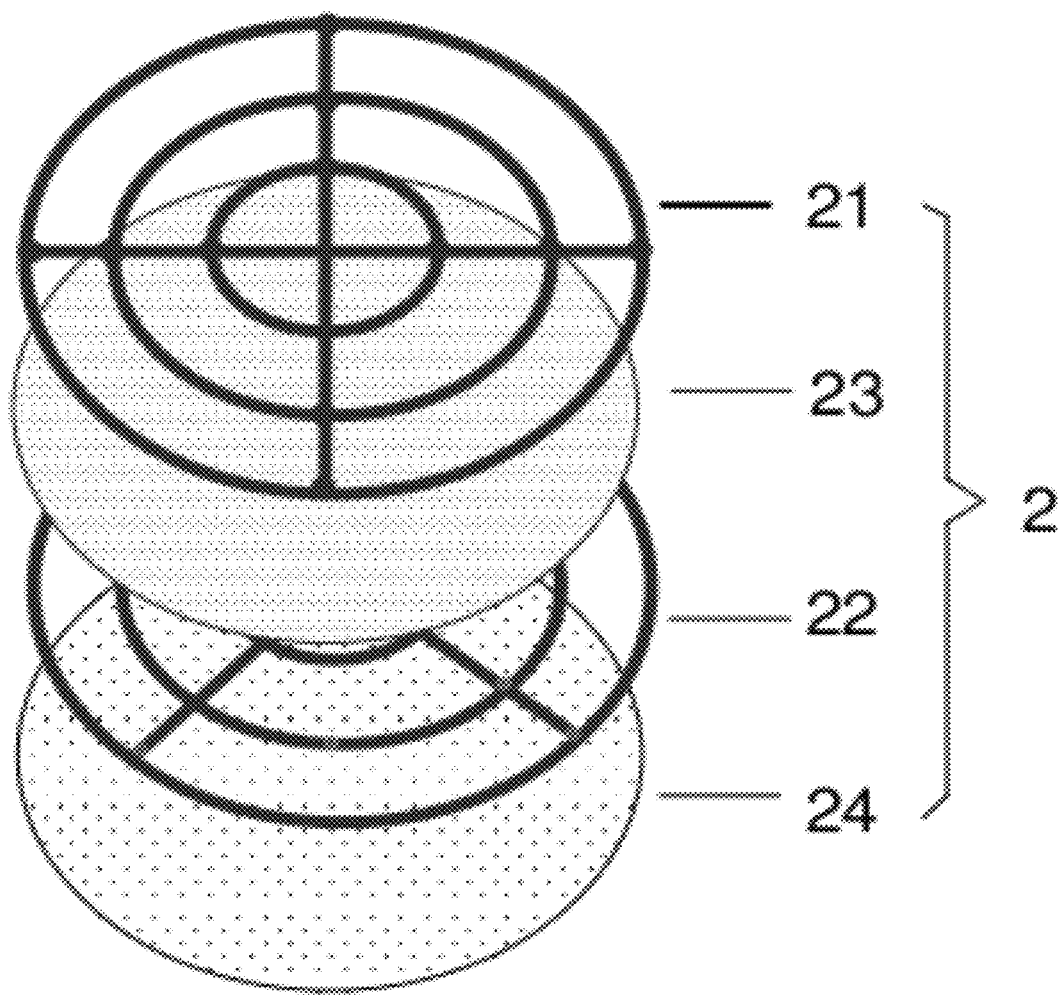
FIG. 3 is an assembly diagram for the top and bottom support plates between the reactor body and the first powder collection tower, metal mesh filter and porous flare-blocking plate for the present invention.
Figure 4A:
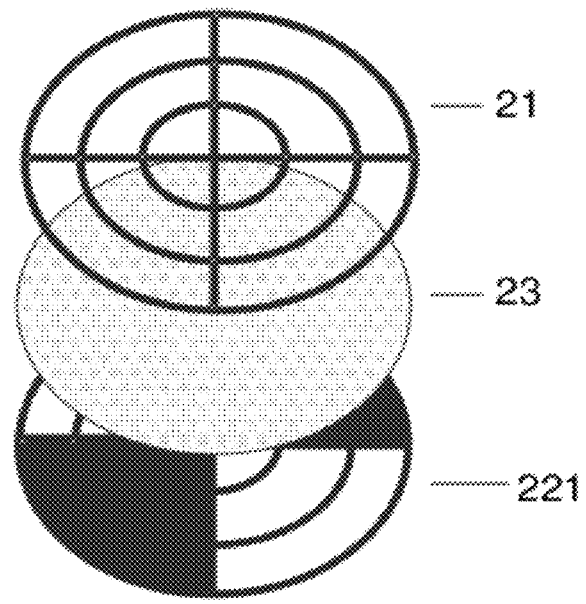
FIG. 4A is an assembly diagram for the close-type porous bottom support plate (with the closed space in the first and the third quadrants) of the powder collection tower and the metal mesh filter.
Figure 4B:
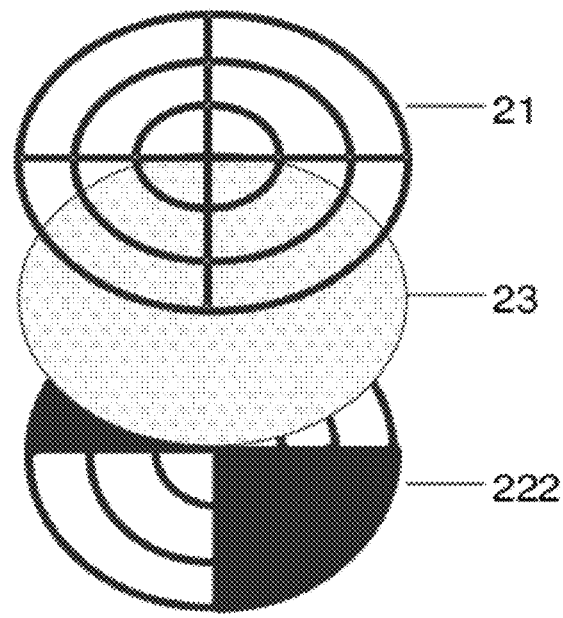
FIG. 4B is an assembly diagram of the close-type porous bottom support plate (with the closed space in the second and the fourth quadrants) of the powder collection tower and the metal mesh filter.

2) Design and Fabricate a Chemical Reactor with Powder Collection a) In the embodiment, chemical reactor with powder collection 1 comprises reactor body 11, the first powder collection tower 12 and the second powder collection tower 13. The chemical reactor 1 is mainly made of Inconel alloy, which is an austenitic nickel-chromium based alloy, or other stainless steels like SS-316, SS-304, SS-316L and SS-304L.

b) The shape of the chemical reactor with powder collection 1 can be cylindrical, as shown in FIGS. 1, 2 and 3, square or others. One end of the reactor body 11 and both ends of the cylindrical tubes of the first and the second powder collection towers 12, 13 have an outer ring 15 for the coupling and fixation with screw nut 14. The material thickness of cylindrical tube is determined by the requirement, usually above 0.3 cm. Its inner diameter is 26.0 cm and its length is 45.9 cm, varying according to production scale. The bottom of reactor body 11 is a sealing plate, so the reactor like a container can hold liquid. Above the reactor body 11, it is a coupling tube, which is hollow at both ends to be used as the powder collection unit.

c) Above the reactor body 11, it is a powder collection tower that is a hollow coupling tube at both ends. They are the first powder collection tower 12 and the second powder collection tower 13, as shown in FIG. 1. The coupling components between the reactor body 11 and the first powder collection tower 12 include a screw nut 14, a porous top support plate 21, a porous bottom support plate 22, a metal mesh filter 23 and a porous flare-blocking plate 24. Please refer to FIG. 3. These components allow complete and tight coupling of the reactor body 11 and the powder collection towers 12, 13 and stepwise expansion of capacity to form a series of powder collection towers, which increases the capacity of the entire reactor system. The first powder collection tower 12 and the second powder collection tower 13 have the same inner diameter and they make up an integrated chemical reactor (including chemical reaction, product collection, emission buffering).

d) The number of expandable powder collection tower can increase according to the demand. The embodiment is a two-level powder collection tower with unit length about 16.46~15.1 cm, inner diameter 26.0 cm and material of Inconel alloy.

e) In the chemical reactor with powder collection 1, as shown in FIGS. 1, 2, 3, 4 and 5, the coupling components between the first powder collection tower 12 and the second powder collection tower 13 and at the top end of the second powder collection tower include a screw nut 14 for inserting a porous top support plate 21, a porous bottom support plate 22 and two levels of 400 mesh (level and mesh number vary according to demand) metal filter 23 to effectively block reaction flare and catch the powder emission to the collection tower. The size of porous top and bottom support plates 21, 22 and the metal mesh filter 23 is determined by the reactor body 11 and the first powder collection tower 12 and the second powder collection tower 13 to assure complete airtightness of the reactor body-powder collection tower. The first and third quadrants of the porous bottom support plate 221 at the coupling interface between the first collection tower and the second collection tower are close-type. The second and fourth quadrants of the porous bottom support plate 222 at the top of the second collection tower are close-type. Please refer to FIGS. 4A and 4B.

3) Design and Fabricate Off-Gas and Powder Dust Treatment System a) The system comprises the off-gas exhaust, water (or specific solution) scrubber, and powder collection units. The emission gas of the little amount of GNC reaction stream ejected from the top of the chemical reactor with powder collection 1 contains very little product powder, which is finally subject to treatment by exhaust and water scrubber system to assure emission quality. Besides, powder can be re-collected from the scrubber solution and heated and dried to return to the product stream, which can increase the yield, assure public safety and environmental safety and meet the environmental requirements.

2. A process to produce the fine (nano and submicron-scale) ceramic powder of specific chemical composition by applying an innovative chemical reactor with powder collection system (CRPC reactor system) to glycine-nitrate combustion method (GNC-P) at least comprises the following steps:

1) Prepare nitrate precursors. Weigh $La(NO_3)_3 \cdot 6H_2O$, $Sr(NO_3)_2$, $Ga(NO_3)_3 \cdot XH_2O$, $Mg(NO_3)_2 \cdot 6H_2O$ in cation molar ratio 0.9:0.1:0.8:0.2. Mix them into deionized water to form a mixture. Pour a pre-dissolved 3.16 mole Glycine into the mixture to form a solution. Heat and agitate the solution to start chelation. For nitrate precursors, besides LSGM-9182, other ceramic oxides with multiple metals can be used, including doped cerias, $La_{1-x}Sr_xMnO_{3-\delta}$, $La_{1-x}Sr_xCO_{1-y}Fe_yO_{3-\delta}$, $Ba_{1-x}Sr_xCO_{1-y}Fe_yO_{3-\delta}$, the materials of perovskite structure.

2) Dissolve the above nitrate precursors in deionized water and add an appropriate amount of glycine. After mixing evenly, pour it into the reactor body 11.

3) Assemble the glycine-nitrate combustion reactor system. Cover it with the porous top plate 2. Lock the reactor body 11 with the powder collection tower 12, 13. Leave it inside the temperature-control heating furnace 3. This is to complete the assembly of the chemical reactor with powder collection 1. The assembly diagram is shown in FIG. 1. FIG. 2 is the cross-sectional diagram. Except for mesh filter, all material for the chemical reactor with powder collection 1 is Inconel alloy. The filter material can be SS or Inconel alloy.

4) Turn on heater. Set temperature at 350° C. and start heating until the reaction product is formed. When the bottom heating plate senses the instant high reaction temperature, temperature-control heating furnace 3 will automatically shut off. This indicates completion of reaction.

5) When reaction flare 5 ejection occurs, the porous flare-blocking plate 24 and the porous top support plate 21 can effectively block the flare to prevent direct flare burning of the metal filter 23 (mesh) of the first powder collection tower 12 and the second powder collection tower 13 and also allow the release of the high pressure caused by the high temperature and preliminarily filter the ejected powder. The filter on the collection tower will catch smaller powder particles. With increasing number of collection towers, the powder collection will be even more complete. The dust collector can collect the escaped powder.

6) Open reactor body 11, the first powder collection tower 12 and the second powder collection tower 13. The reaction powder product 4 is mainly accumulated at the bottom of the reactor and each collection tower. Collect the powder from the reactor body 11, the first powder collection tower 12 and the second powder collection tower 13 to complete powder production process. Measurement and characterization of thermal treatment characteristics of powder can be conducted. Powder characterization is mainly on crystal lattice to assure product quality and provide the basis for further sintering process.

Figure 5:
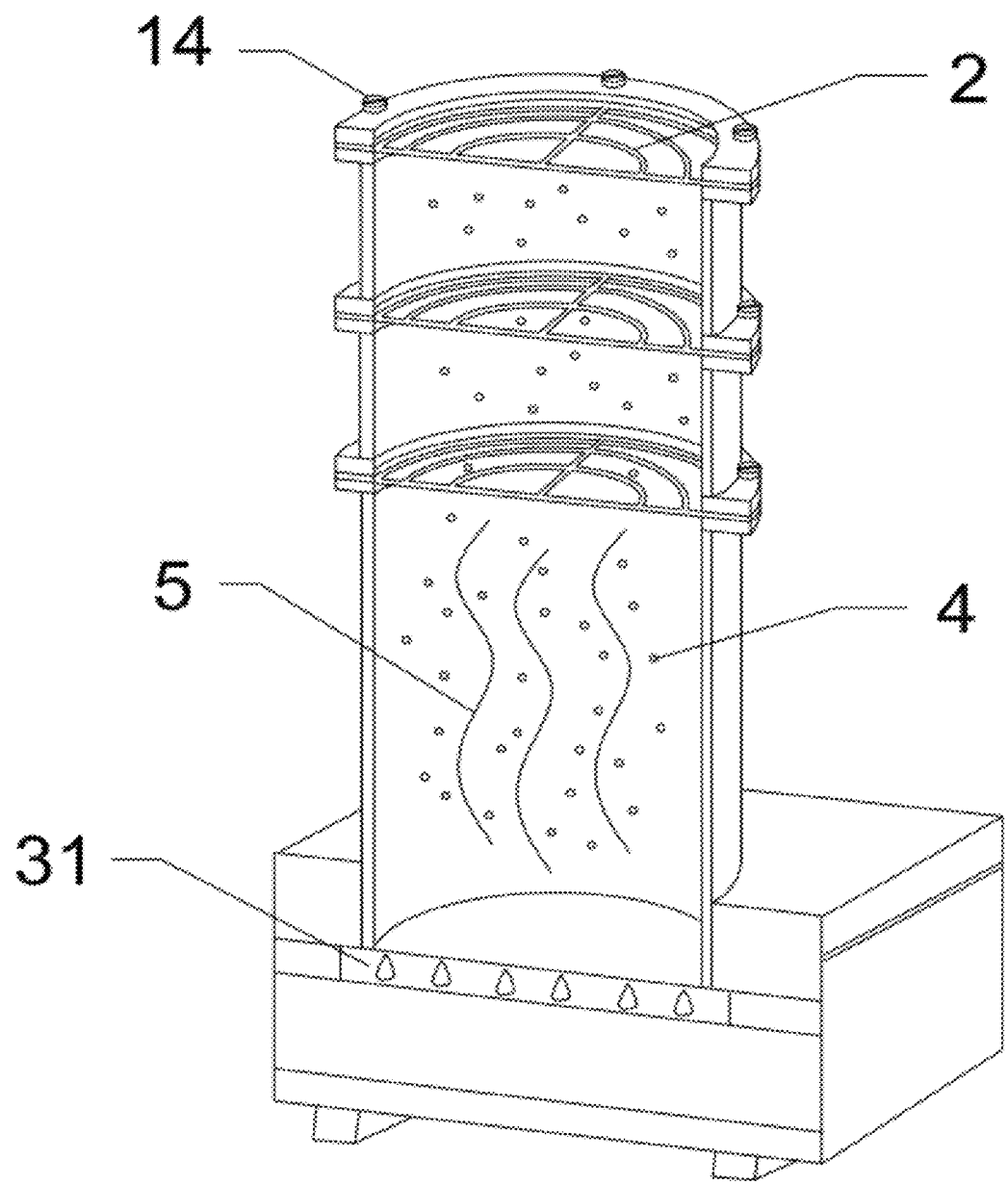
FIG. 5 is a diagram of powder capture and collection for the present invention.
Figure 6:
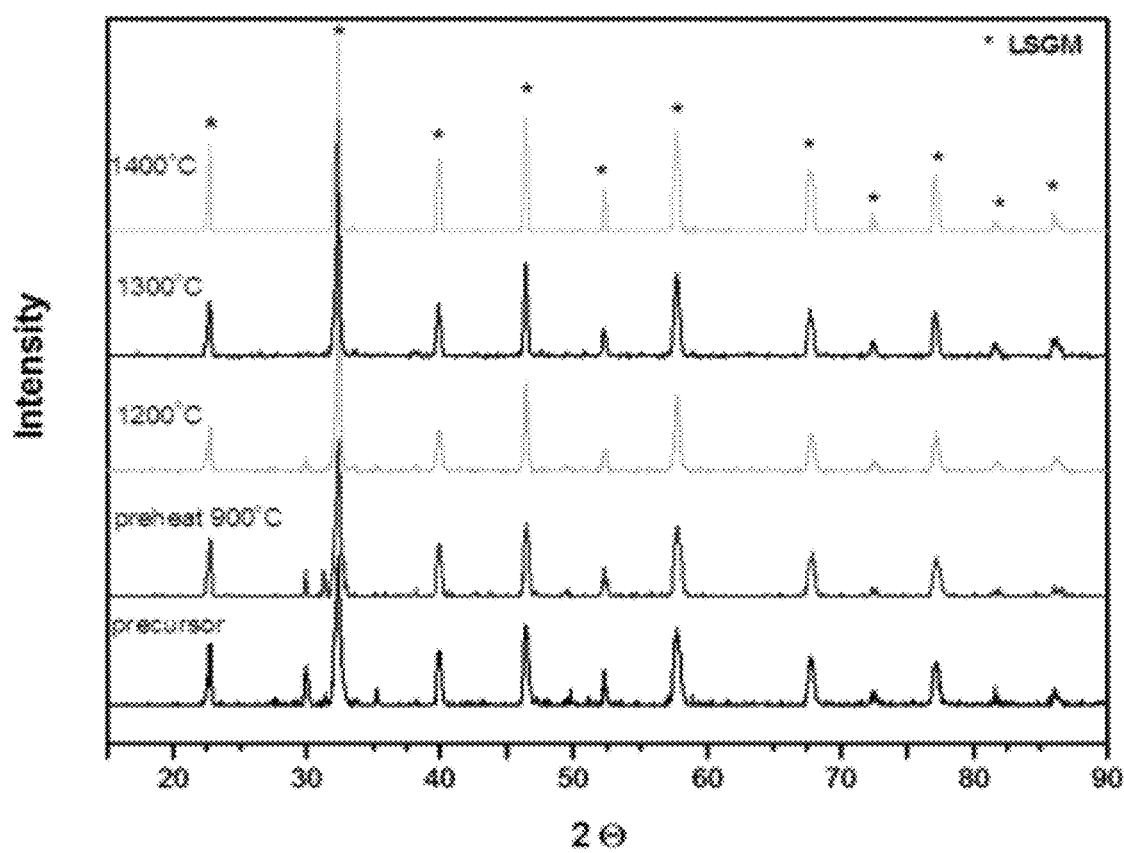
FIG. 6 is an XRD pattern diagram for LSGM powder for the present invention.

FIG. 5 is the diagram of powder capture and collection for the reactor of the present invention. FIG. 6 is the XRD analysis diagram for the LSGM powder from the reactor of the present invention. They all prove that the excellence, necessity, innovation and technical importance of the reactor shall meet the patent application requirements. Thus, the application is submitted.

What is claimed is:

1. An apparatus that is applied to a glycine-nitrate combustion process to produce fine ceramic powder, said apparatus comprising:
a chemical reactor with powder collection system, including a reactor body, one or more porous powder-blocking plate assemblies, a plurality of cylindrical tube-shaped powder collection tower components, and a porous flare-blocking plate assembly;
a heating component including a housing, a heating furnace with temperature control, and a support for the reactor body; and
an emission or off-gas and powder dust treatment system, comprising an off-gas exhaust and water or specific solution scrubbing system and a dust collector;
wherein each porous powder-blocking plate assembly of the one or more porous powder-blocking plate assemblies comprises a hollow top support plate, a plurality of metal mesh filters, and a hollow bottom support plate; and
wherein the porous flare-blocking plate assembly comprises a hollow top support plate, a plurality of metal mesh filters, a hollow bottom support plate, and a porous flare-blocking plate.

2. The apparatus of claim 1, wherein the material used for the heating component is mainly stainless steel, and the temperature range for the heating component is between 25° C. and 500° C.

3. The apparatus of claim 1, wherein one end of the reactor body and both ends of each cylindrical tube-shaped powder collection tower component have a coupling interface with an outer ring for coupling and fixation by screw nuts.

4. The apparatus of claim 3, wherein the plurality of cylindrical tube-shaped powder collection tower components include a first powder collection tower component and a second powder collection tower component;
wherein the porous flare-blocking plate assembly is located at a coupling interface between the reactor body and one end of the first powder collection tower component; and wherein a porous powder-blocking plate assembly of the one or more porous powder-blocking plate assemblies is located at a coupling interface between the other end of the first powder collection tower component and one end of the second powder collection tower component.

5. The apparatus of claim 4, wherein the hollow bottom support plate at the coupling interface between the first powder collection tower component and the second powder collection tower component defines four quadrants, and the first and third quadrants are closed.

6. The apparatus of claim 4, wherein an additional porous powder-blocking plate assembly of the one or more porous powder-blocking plate assemblies is located at the other end of the second powder collection tower component defines four quadrants, and the second and fourth quadrants are closed.

7. The apparatus of claim 1, wherein the chemical reactor with the powder collection system is mainly made of an austenitic nickel-chromium alloy material or other stainless steels, and the reactor body shape is cylindrical or square, and wherein the reactor body bottom has a sealing plate to provide liquid holding ability and heating function.

* * * * *